US007376445B2

(12) United States Patent
Nakayama

(10) Patent No.: US 7,376,445 B2
(45) Date of Patent: May 20, 2008

(54) MOBILE PHONE, PERSONAL DATA MANAGING METHOD TO BE USED IN SAME, AND PERSONAL DATA MANAGING CONTROL PROGRAM

(75) Inventor: Akira Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/103,396

(22) Filed: Apr. 11, 2005

(65) Prior Publication Data

US 2005/0227729 A1    Oct. 13, 2005

(30) Foreign Application Priority Data

Apr. 9, 2004  (JP) ............................. 2004-115406

(51) Int. Cl.
*H04B 1/38* (2006.01)
(52) U.S. Cl. ...................................... 455/558; 455/557
(58) Field of Classification Search ................ 455/409, 455/47, 73, 558, 412.1, 557; 235/375
See application file for complete search history.

(56) References Cited

U.S. PATENT DOCUMENTS

| 5,996,028 | A | 11/1999 | Niimi et al. | |
|---|---|---|---|---|
| 2002/0045457 | A1 | 4/2002 | Taniguchi | |
| 2005/0109828 | A1* | 5/2005 | Jay et al. | 235/375 |
| 2005/0136979 | A1* | 6/2005 | Dietl et al. | 455/558 |
| 2005/0176465 | A1* | 8/2005 | Fornell | 455/558 |
| 2005/0181829 | A1* | 8/2005 | Cho et al. | 455/558 |

FOREIGN PATENT DOCUMENTS

| CN | 1399411 A | 2/2003 |
|---|---|---|
| CN | 1437372 A | 8/2003 |
| EP | 0 822 730 A2 | 2/1998 |
| JP | 11-215231 | 8/1999 |
| JP | 2000-201234 | 7/2000 |
| JP | 2002-300254 | 10/2002 |
| JP | 2004-40595 | 2/2004 |

\* cited by examiner

*Primary Examiner*—Duc M. Nguyen
*Assistant Examiner*—Wayne Cai
(74) *Attorney, Agent, or Firm*—Scully, Scott, Murphy & Presser, P.C.

(57) ABSTRACT

A mobile phone is provided which is capable of improving security of personal data of each user when one mobile phone is commonly used by a plurality of users. The mobile phone proper is commonly used by a plurality of users and holds personal data of only a user who logged on with the user's exclusive information attachment being connected to the mobile phone proper, and on the other hand, when the user logs off, moves and saves personal data of the user into the user's exclusive information attachment. In the log-on operations, the mobile phone proper, when a new user has not been registered therein, since the mobile phone proper is in an available state, registers the new user therein and moves personal data of the new user from the information attachment and holds the data. In the log-off operations, the mobile phone proper, when the user has been registered therein and personal data of the user has been held therein, cancels the registration of the user and moves the personal data of the user from the mobile phone proper into the information attachment.

20 Claims, 5 Drawing Sheets

MOBILE PHONE, PERSONAL DATA MANAGING METHOD TO BE USED IN SAME, AND PERSONAL DATA MANAGING CONTROL PROGRAM

BACKGROUND OF THE INVENTION

1. Field of the Invention

The present invention relates to a mobile phone, a personal data managing method, and a personal data managing control program, and more particularly to the mobile phone which is suitably employed when the mobile phone is used commonly by a plurality of users, and the personal data managing method for managing the personal data to be employed in the mobile phone, and the personal data managing control program to be used in the mobile phone.

The present application claims priority of Japanese Patent Application No. 2004-115406 filed on Apr. 9, 2004, which is hereby incorporated by reference.

2. Description of the Related Art

In ordinary cases, a mobile phone is manufactured on a premise that one mobile phone is used by one user, however, in some cases, the one mobile phone is commonly used by a plurality of users in a workplace, family, or a like. In this case, even if personal data of one user is stored in the mobile phone and is seen by other users, conventionally, it does not present a problem from a privacy viewpoint since contents of the personal data are a telephone directory or a like at the most. However, in recent years, a mobile phone has become multifunctional and is provided with various functions including a scheduler, a mailer, or a like, in many cases. As a result, personal data stored in the mobile phone is diversified and, therefore, it is difficult for each user to manage such personal data stored in the mobile phone according to a rule made by each user. For example, when one mobile phone is commonly used by a plurality of employees in a workplace and one employee takes the mobile phone out for a business trip for a short time, it is impossible that personal data stored in a presently-available mobile phone is separated for every user, thus causing great inconvenience. Moreover, since personal data of a user can be easily referenced or manipulated by an other user, a problem from viewpoints of privacy among users and of security of personal data occurs. Therefore, a mobile phone having succeeded in solving these problems is proposed.

One example of a conventional method for setting an environment in which a speech terminal is used is disclosed in Japanese Patent Application Laid-open No. 2000-201234 (page 1, FIG. 2) in which, by making a portable memory (mobile phone card) of the speech terminal save a user's most suitable setting condition for an environment in which a device can be used and by making the speech terminal read out the setting information when the speech terminal is operated, the terminal can be operated by any speech terminal on the same setting conditions at any time.

Similarly, a portable communication terminal is disclosed in Japanese Patent application Laid-open No. 2004-040595 (Abstract, FIG. 2) in which management information in which user data of a plurality of users and a PIN (Personal Identification Number) number set by each user is stored in a storing section and user data corresponding to the PIN number input by a user's operation of an operating inputting section is read out from the storing section and the read user data is displayed on a displaying section. By configuring as above, even when one portable communication terminal is commonly used by a plurality of users, data of each of the plurality of users can be independently held and managed.

Moreover, another portable communication terminal is disclosed in Japanese Patent Application Laid-open No. Hei 11-215231 (Abstract, FIG. 1) in which the portable communication terminal has a personal information storing section that stores, at least, personal identification codes and PIN (Personal Identification Number) codes and a compacted number storing section provided on an individual basis that stores a compacted number table and compacted numbers serving as user's information collectively in its compacted number storing section. When the personal identification code and PIN code both being input by users' specified operations are authenticated by a personal identification section, use of the compacted number table prepared on an individual basis is allowed.

However, the conventional technology as described above has following problems. That is, in the case of the conventional method for setting an environment in which a speech terminal is used which is disclosed in the Japanese Patent Application Laid-open No. 2000-201234, if a third party fraudulently obtains the mobile phone card, data stored in the mobile phone card is referenced to by another mobile phone, causing problems in terms of privacy among users and security of personal data.

Also, in the case of the portable communication phone disclosed in Japanese Patent application Laid-open No. 2004-040595, since data of all users is stored collectively, the same problem as in the technology disclosed in Japanese Patent Application Laid-open No. 2000-201234 occurs and, additionally, if an amount of user's data becomes large, a trouble of a failure in storing personal data in the mobile phone proper occurs. Furthermore, in the case of the another portable communication terminal disclosed in Japanese Patent Application Laid-open No. Hei 11-215231, since compacted numbers are stored collectively by the compacted number storing section, the same problem as in the technology disclosed in the Japanese Patent Application Laid-open No. 2004-040595 occurs.

SUMMARY OF THE INVENTION

In view of the above, it is an object of the present invention to provide a mobile phone, a personal data managing method, and a personal data managing control program, which are capable of improving security of personal data and of avoiding a trouble of a failure in storing personal data in the mobile phone.

According to a first aspect of the present invention, there is provided a mobile phone including:

a mobile phone proper; and a plurality of storage units, each of which is so configured as to be detachable from and attachable to the mobile phone proper;

wherein the mobile phone proper is so configured as to hold only specified data stored in one attached and logged-on thereto out of the plurality of the storage units.

In the foregoing first aspect, a preferable mode is one wherein the mobile phone proper is so configured as to perform log-off operation to move and save the specified data from the mobile phone proper into the storage unit corresponding to the log-off.

Also, a preferable mode is one wherein the plurality of the storage units each includes a memory card.

According to a second aspect of the present invention, there is provided a mobile phone for holding personal data of a user and performing a specified communicating operation including:

a mobile phone proper being commonly used by a plurality of users; and a plurality of storage units each being used by each of the users and storing personal data of each of the users, and each of the storage units being so configured as to be detachable from and attachable to the mobile phone proper;

wherein the mobile phone proper is so configured as to hold the personal data of only a user who logged on by attaching the user's storage unit to the mobile phone proper.

In the foregoing second aspect, a preferable mode is one wherein the mobile phone proper is so configured as to move and save the personal data of the user from the mobile phone proper into the storage unit, when the user logs off from the mobile phone proper.

Also, a preferable mode is one wherein each of the plurality of storage units is so configured as to store user information that specifies the user who is authorized to use the storage unit itself, and wherein the mobile phone proper is configured, in log-on operations, when the user of the mobile phone has not been registered in the mobile phone proper, so as to register the user according to the user information being stored in the storage unit connected to the mobile phone proper and to hold the personal data of the user by moving the personal data from the storage unit and, in log-off operations, when the user has been registered in the mobile phone proper and when the personal data has been held in the mobile phone proper, so as to cancel the registration of the user and to move the personal data from the mobile phone proper to the storage unit.

Another preferable mode is one wherein the mobile phone proper is so configured as to register authentication information of each of the users in advance, and to perform authentication on an arbitrary user who requires beginning or terminating of using the mobile phone, by checking the registered authentication information against authentication information input by the arbitrary user and, after the authentication, to perform the log-on or log-off operations.

Still another preferable mode is one wherein the plurality of the storage units each includes a memory card.

A further preferable mode is one wherein the user includes a person or a group made up of a plurality of members.

According to a third aspect of the present invention, there is provided a personal data managing method for managing personal data to be employed in a mobile phone including a mobile phone proper being commonly used by a plurality of users; and a plurality of storage units each being used by each of the users and storing personal data of each of the users, and each of the storage units being so configured as to be detachable from and attachable to the mobile phone proper, the method including:

a step of holding the personal data of only a user who logged on by attaching the user's storage unit to the mobile phone proper; and a step of moving and saving the personal data of the user from the mobile phone proper into the storage unit, when the user logs off from the mobile phone proper.

In the foregoing third aspect, a preferable mode is one wherein each of the plurality of storage units stores user information that specifies the user who is authorized to use the storage unit itself, and wherein the mobile phone proper, in the log-on operations, when the user has not been registered in the mobile phone proper, registers the user according to the user information being stored in the storage unit connected to the mobile phone proper and moves the personal data of the user from the storage unit to hold the personal data and, in the log-off operations, when the user has been registered in the mobile phone proper and the personal data of the user has been held, cancels the registration of the user and moves the personal data from the mobile phone proper to the storage unit.

Also, a preferable mode is one wherein authentication information of each of the plurality of users is registered in advance in the mobile phone proper, and authentication is performed by checking the registered authentication information against authentication information input by the user who requires beginning or terminating of using the mobile phone and, after the authentication, the log-on or log-off operations are performed.

According to a fourth aspect of the present invention, there is provided a personal data managing control program to make a computer mounted in a mobile phone execute a personal data managing method for managing personal data, the mobile phone including a mobile phone proper being commonly used by a plurality of users; and a plurality of storage units each being, used by each of the users and storing personal data of each of the users, and each of the storage units being so configured as to be detachable from and attachable to the mobile phone proper, the method including:

a step of holding the personal data of only a user who logged on by attaching the user's storage unit to the mobile phone proper; and a step of moving and saving the personal data of the user from the mobile phone proper into the storage unit, when the user logs off from the mobile phone proper.

With the above configuration, the mobile phone holds personal data of only a current user who logged on to the mobile phone by using the exclusive storing device, and currently uses the mobile phone, and on the other hand saves personal data of former users who logged off in their exclusive storing devices by moving personal data of the former users from the mobile phone to their exclusive storing devices and, therefore, even if the mobile phone is commonly used by a plurality of users, personal data stored and used temporarily in the mobile phone is managed, on an individual basis, which can improve security of personal data of a user. Moreover, since the storing device is connected to the mobile phone being presently used, a user of the mobile phone proper is identified and only the user's personal data stored in the mobile phone proper moves between the storing device and mobile phone proper and, as a result, while the mobile phone proper is being used, only personal data of a user employing the mobile phone proper exists in the mobile phone proper. Therefore, even if many users are using the mobile phone, a maximum amount of personal data being stored in the mobile phone proper does not exceed storage capacity of the above storing device and the trouble of a failure in storing personal data in the mobile phone proper does not occur.

Furthermore, when the storing device is connected to the mobile phone proper, not only authentication based on user information stored in the storing device but also authentication based on authentication information input by a user is performed and, therefore, an unauthorized use of the storing device by a person other than the user who has stored the user information in the storing means becomes impossible. As a result, it is possible to improve security of the storing device.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. In embodiments, a mobile phone is provided in a manner to read personal data of a user from an attachment type of the user's exclusive storing device such as a memory card (hereinafter may be referred to an information attachment) if the user has logged on to the mobile phone proper by attaching and connecting the user's exclusive information attachment to the mobile phone proper, and hold the read personal data of the user, until the user logs off, and on the other hand to move personal data of the user from the mobile phone to the user's information attachment, when the user logs off from the mobile phone proper, so that personal data of the user is deleted from the mobile phone proper and is stored only in the user's exclusive information attachment.

First Embodiment

Figure 1:
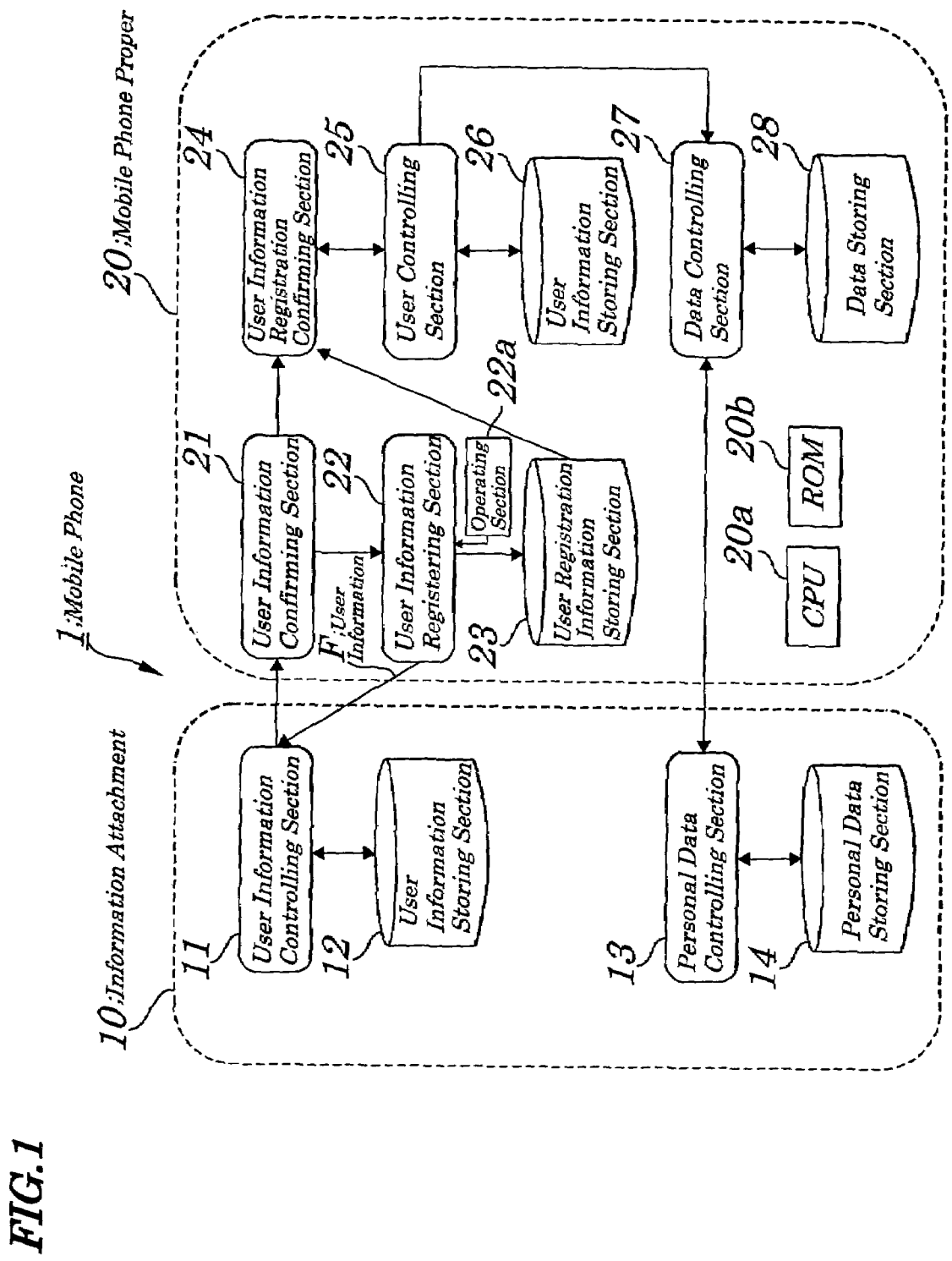
FIG. 1 is a block diagram showing electrical configurations of main parts of a mobile phone according to a first embodiment of the present invention.

FIG. 1 is a block diagram showing electrical configurations of main parts of a mobile phone 1 according to a first embodiment of the present invention. The mobile phone 1, as shown in FIG. 1, is made up of an information attachment 10 and a mobile phone proper 20, and holds personal data of a user and performs specified communicating operations. The information attachment 10 is exclusively provided for each user of the mobile phone proper 20 and is constructed in a manner to be detachable from and attachable to the mobile phone proper 20 and stores user information to specify a person (owner) who is authorized to exclusively use this information attachment 10 and personal data of the exclusive user. Moreover, though only one information attachment 10 is shown in FIG. 1, however, each of a plurality of mobile phone users has one information attachment 10 individually. The mobile phone proper 20 is used commonly by a plurality of users and holds personal data of only a user who has logged on with the user's information attachment 10 being connected to the mobile phone proper 20, and on the other hand, when the user logs off from the mobile phone proper 20, moves and saves personal data of the exclusive user into the user's information attachment 10, before the user's information attachment 10 is detached from the mobile phone proper 20. That is, while log-on operations are performed, the mobile phone proper 20, registers the exclusive user according to user information stored in the connected information attachment 10 and holds the personal data of the user by moving the personal data from the information attachment 10. While log-off operations are performed, the mobile phone proper 20, if the personal data of the user has been registered therein and the personal data of the user has been held therein, cancels the registration of the user and transfers the personal data of the user to the information attachment 10.

The information attachment 10 is made up of, for example, a memory card or a like and has a user information controlling section 11, a user information storing section 12, a personal data controlling section 13, and a personal data storing section 14. Moreover, the mobile phone proper 20 includes a CPU. (Central Processing Unit) 20a, a ROM (Read Only Memory) 20b, a user information confirming section 21, a user information registering section 22, an operating section 22a, a user registration information storing section 23, a user information registration confirming section 24, a user controlling section 25, a user information storing section 26, a data controlling section 27, and a data storing section 28. The user information controlling section 11 receives user information F produced by the user information registering section 22 in the mobile phone proper 20, and stores the user information F to the user information storing section 12. The user information controlling section 11, when a request for the user information F is made from the user information confirming section 21, reads out the user information F stored in the user information storing section 12 and transmits the user information F to the user information confirming section 21.

The user information storing section 12 stores one set of user information F (that is, information for one user) and reads and writes the user information F by using the user information controlling section 11. The personal data controlling section 13 obtains personal data transmitted from the data controlling section 27 of the mobile phone proper 20 and stores the personal data in the personal data storing section 14. The user information storing section 12, when desiring to obtain personal data from the data controlling section 27, reads the personal data stored in the personal data storing section 14 and transfers the personal data to the data controlling section 27. The personal data described above includes, for example, a telephone directory, an electronic mail, setting information, or a like to be used in the mobile phone 1. The personal data storing section 14 stores personal data corresponding to the user information F stored in the user information storing section 12 and reads or writes the personal data by using the personal data controlling section 13.

The CPU 20a controls the entire mobile phone 1. The ROM 20b stores a personal data managing control program to make a computer to operate the CPU 20a. The user information confirming section 21 makes a request asking user information F of the user information controlling section 11 in the information attachment 10 to obtain the user information F. The user information confirming section 21, when having succeeded in obtaining the user information F, transfers the user information F to the user information registration confirming section 24. The user information confirming section 21, when having failed to obtain the user information F from the user information controlling section 11, instructs the user information registering section 22 to perform specified processing. The user information registering section 22 has a operating section 22a made up of button switches (not shown) or a like and allows the user to register a user name to be contained in the user information F in accordance with an instruction provided by the user information confirming section 21. The user information registering section. 22 automatically produces user information F by using the registered user name and stores the user information F in the user registration information storing section 23 and transmits the same data (user information F) to the user information controlling section 11 of the information attachment 10. The user information F is made up of a user name, authentication password, and terminal identification number.

The user registration information storing section 23 stores the user information F transferred from the user information registering section 22. In the user registration information storing section 23, user information F of each of a plurality of users who use commonly the mobile phone proper 20 is stored collectively.

The user information registration confirming section 24 checks whether or not the user information F obtained from the user information confirming section 21 is stored in the user registration information storing section 23 or whether or not the user information F coincides with registered contents and, if the user information F coincides with the registered contents, transfers a user name F1 (see FIG. 2) contained in the corresponding user information F to the user controlling section 25.

When the user wishes log-on to the mobile phone 1, the user controlling section 25, if a current user name F1 of the mobile phone 1 is not stored in the user information storing section 26, recognizes that the mobile phone proper 20 is in an available state, since no other user uses the mobile phone proper 20, and performs log-on processing.

On the other hand, when the user wishes log-off from the mobile phone 1, the user controlling section 25, if the current user name F1 of the mobile phone 1 is stored in the user information storing section 26, recognizes that the mobile phone proper 20 is not in an available state, since any user currently uses the mobile phone proper 20, and checks whether the user name F1 obtained from the user information registration confirming section 24 coincides with the user name of the mobile phone 1 stored in the user information storing section 26 and, only when both of the names coincide with each other, performs log-off processing.

In the above log-on processing, the user controlling section 25 stores the user name F1 obtained from the user information registration confirming section 24 in the user information storing section 26 and transmits a request for log-on processing to the data controlling section 27. This causes the mobile phone proper 20 to be put in a state in which its user exists. Moreover, in the log-off processing, the user controlling section 25 deletes the user name F1 of the currently used mobile phone 1 stored in the user information storing section 26 and transmits a request for log-off processing to the data controlling section 27. This causes the mobile phone proper 20 to be put in a state in which its user does not exist. The user information storing section 26 stores one item of a name of the user who is presently using the mobile phone proper 20. When the user name is stored in the user information storing section 26, a state is shown in which there is the user who currently uses and validly the mobile phone proper 20. When the user name is not stored in the user information storing section 26, a state is shown in which the mobile phone proper 20 is not used by any user, that is, is available.

The data controlling section 27 controls data stored in the data storing section 28 according to a request for log-on/log-off operations issued from the user controlling section 25. That is, the data controlling section 27, when receiving a request for log-on processing made by the user controlling section 25, makes a request to the personal data controlling section 13 in the information attachment 10 for transfer of personal data and obtains the personal data and stores the personal data in the data storing section 28. On the other hand, the data controlling section 27, when receiving a request for log-off processing issued from the user controlling section 25, obtains personal data being currently stored in the data storing section 28 and transfers the personal data to the personal data controlling section 13 in the information attachment 10. The data storing section 28 stores personal data to be used by the mobile phone proper 20.

Figure 2:
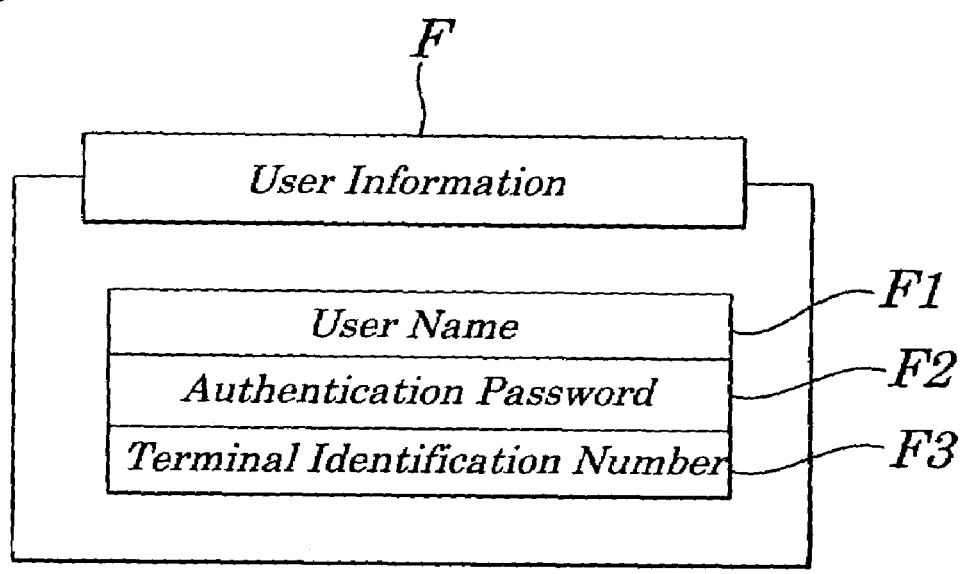
FIG. 2 is a diagram showing user information to be used by a user information storing section or a user registration information storing section shown in FIG. 1.

FIG. 2 is a diagram showing user information F to be used by the user information storing section 12 or the user registration information storing section 23 shown in FIG. 1. The user information F is made up of the user name F1, an authentication password F2, and a terminal identification number F3. The user name F1 denotes a name of the present user of the information attachment 10 and the mobile phone proper 20. The authentication password F2 denotes a password corresponding to the user name F1. The terminal identification number F3 is, for example, a manufacturing number which is a number set uniquely in the mobile phone proper 20.

Figure 3:
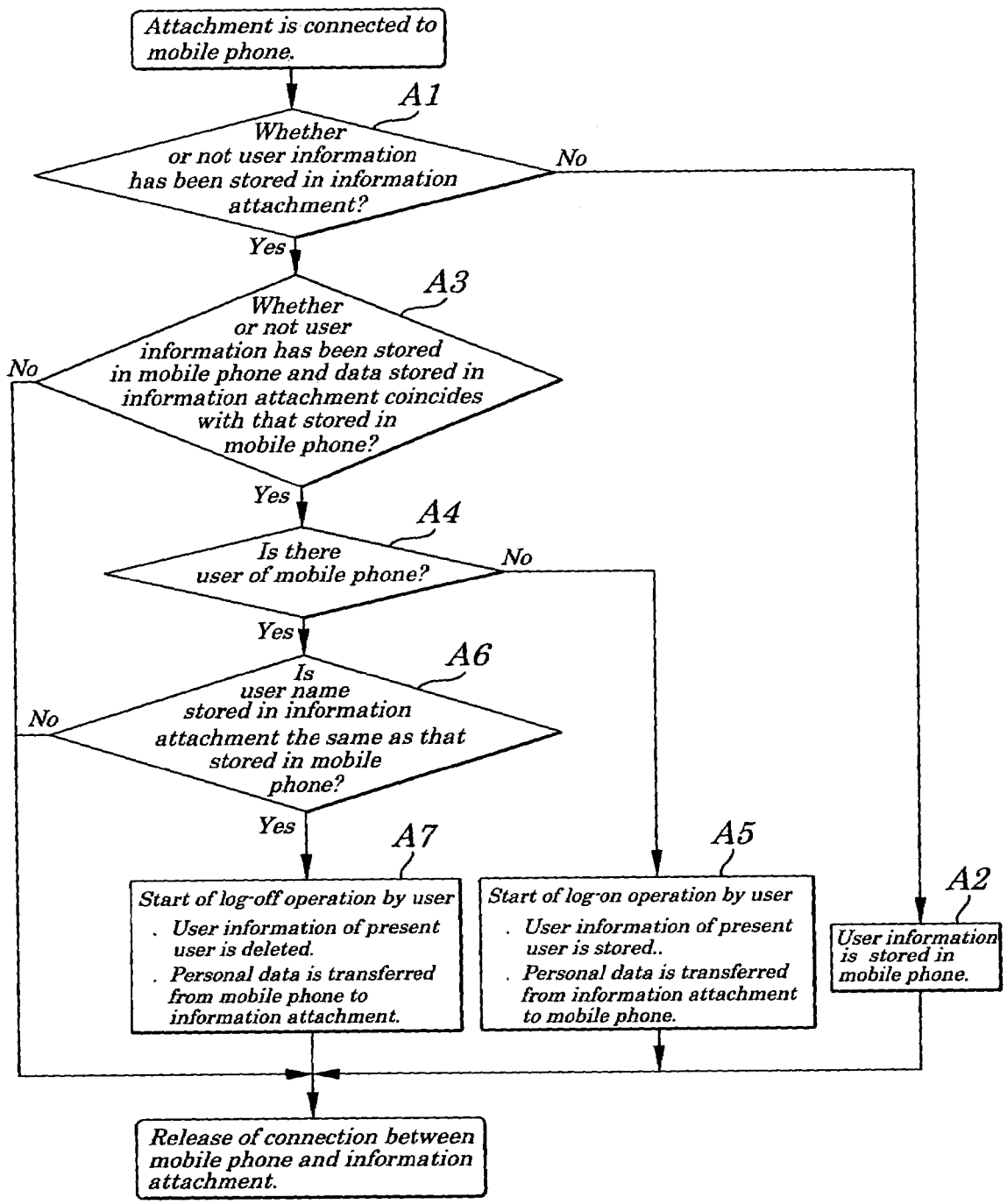
FIG. 3 is a flowchart explaining operations of the mobile phone shown in FIG. 1.

FIG. 3 is a flowchart explaining operations of the mobile phone 1 shown in FIG. 1. Contents of processing of managing personal data to be employed in the mobile phone 1 of the embodiment are described by referring to FIG. 3. First, the information attachment 10 is physically connected to the mobile phone proper 20. User information F stored in the user information storing section 12 is read by the user information confirming section 21 in the mobile phone proper 20 and is transferred to the user information controlling section 11 in the information attachment 10 and whether or not the user information F has been set in the user information storing section 12 of the information attachment 10 is judged (Step A1). If the user information F has not been set in the user information storing section 12, the user information registering section 22 makes a request asking the user to input the name of the user. At this time, a message "Input user name" or a like is displayed on a displaying section (not shown)

When the user name F1 is input from the operating section 22a, the user information F including the authentication password F2, the terminal identification number F3, and the user name F1 is produced, and is stored into the user registration information storing section 23. This time, the user information F is also transferred to the user information controlling section 11 of the information attachment 10 (Step A2). The user information controlling section 11 stores the user information F into the user information storing section 12 and releases the connection between the mobile phone proper 20 and the information attachment 10 (for example, electrically disconnects the information attachment 10 from the mobile phone 20) to terminate the procedures.

In the above Step A1, if the user information F has been stored in the user information storing section 12 of the information attachment 10, the user information registration confirming section 24 checks whether or not the user information obtained from the user information storing section 12 of the information attachment 10 has been stored, as the same data, in the user registration information storing section 23 (Step A3). The user information registration confirming section 24, if it is determined that the user information F obtained from the user information storing section 12 has not been stored in the user registration information storing section 23 or that the obtained user information F does not coincide with that stored in the user registration information storing section 23, judges that the information attachment 10 does not correspond to the mobile phone proper 20 and releases the connection between the information attachment 10 and the mobile phone proper 20 to terminate the procedures. Moreover, if the user information F obtained from the user information storing section 12 in the information attachment 10 coincides with the data stored in the user registration information storing section 23, the user information registration confirming section 24 transfers the user name F1 of the coincided user information F to the user controlling section 25.

Next, the user controlling section 25 checks whether or not the name of the user of the presently-used mobile phone 1 has been registered in the user information storing section 26 (Step A4) and, when the user name has not been registered in the user information storing section 26, recognizes that the mobile phone proper 20 is not currently being used (that is, mobile phone proper 20 is in an available state) and log-on operations are started. When the log-on operations are started, the user controlling section 25 stores the user name obtained from the user information registration confirming section 24, as the name of the user of the mobile phone 1, in the user information storing section 26 and makes a request asking the data controlling section 27 to perform the log-on operations. The data controlling section 27, when receiving a request for the log-on operations, makes a request asking the personal data controlling section 13 of the information attachment 10 to transfer personal data to the data controlling section 27 and obtains the personal data and transfers the obtained personal data (that is, personal data of the user who has logged on) to the data storing section 28 (Step A5) and, after that, releases the connection between the information attachment 10 and the mobile phone proper 20 to terminate the procedures.

In the above Step A4, when the name of the user of the mobile phone 1 has been stored in the user information storing section 26, the user controlling section 25 checks whether or not the user name registered in the information attachment 10 is the same as the name of the user of the mobile phone proper 20 (Step A6) and, when the user name registered in the information attachment 10 does not coincide with the user name stored in the mobile phone proper 20, judges that the information attachment 10 is invalid and releases the connection between the information attachment 10 and the mobile phone proper 20 to terminate the procedures. When the user name transferred from the user information registration confirming section 24 coincides with the user name of the mobile phone 1 stored in the user information storing section 26, the user controlling section 25 recognizes that the information attachment corresponding to the present user of the mobile phone proper 20 is connected and starts log-off operations. The user controlling section 25, when the log-off operation is started, deletes the user name of the mobile phone 1 registered in the user information storing section 26 and makes a request asking the data controlling section 27 to perform the log-off operations.

The data controlling section 27, when receiving a request for the log-off operations, transmits personal data stored in the data storing section 28 to the personal data controlling section 13 in the information attachment 10. The personal data controlling section 13 saves the obtained personal data (that is, personal data of the user who logged off) in the personal data storing section 14 (Step A7). After that, the connection between the information attachment 10 and the mobile phone proper 20 is released to terminate the procedures.

Thus, according to the first embodiment, the mobile phone proper 20 holds only personal data of the user who logged on with the information attachment 10 being connected to the mobile phone proper 20, and saves personal data of other user who logged off into the other user's exclusive information attachment 10 to be individually used only by the other user and, therefore, even if the mobile phone proper 20 is commonly used by a plurality of users, personal data such as a telephone directory, electronic mail or a like stored in the mobile phone proper 20 is managed on an individual basis which enables improvement of security of personal data. Moreover, since the information attachment 10 is connected to the mobile phone proper 20 and the user of the mobile phone proper 20 can be identified and only personal data of the user stored in the mobile phone proper 20 moves between the information attachment 10 and the mobile phone proper 20, during a period of time when the mobile phone proper 20 is being used, only personal data of the user who is using the mobile phone proper 20 exists. As a result, even when the mobile phone 1 is used by many users, a maximum amount of personal data stored in the mobile phone proper 20 does not exceed storage capacity of the personal data storing section 14 in the information attachment 10, which prevents a problem of a failure in storing personal data in the mobile phone proper 20.

Second Embodiment

In the first embodiment described above, the information attachment 10 can be used comparatively easily by a user other than the user whose user information F has been registered, a problem may remain somewhat in terms of security of the information attachment 10. To solve this problem, a second embodiment is described which can improve the security of personal data.

Figure 4:
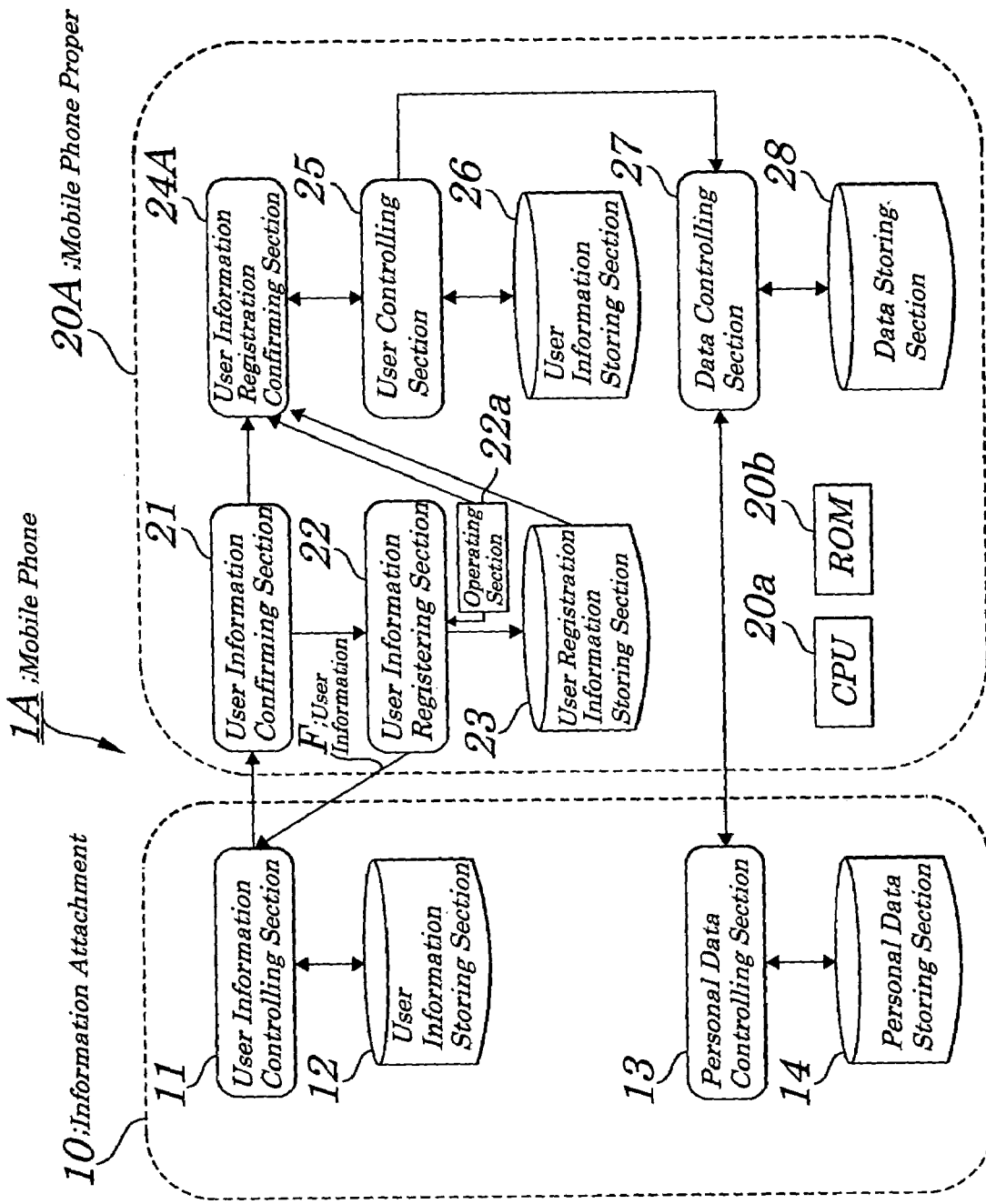
FIG. 4 is a block diagram showing electrical configurations of main parts of a mobile phone according to a second embodiment of the present invention.

FIG. 4 is a block diagram showing electrical configurations of main parts of a mobile phone 1A according to a second embodiment of the present invention. In FIG. 4, same reference numbers are assigned to components having the same functions as those in the first embodiment shown in FIG. 1. The mobile phone 1A of the second embodiment includes a mobile phone proper 20A having configurations being different from those employed in the mobile phone proper 20 of the first embodiment shown in FIG. 1. The mobile phone proper 20A is provided with a user information registration confirming section 24A to which new functions are added, instead of the user information registration confirming section 24 shown in FIG. 1. The user information registration confirming section 24A has functions, in addition to the functions that the user information registration confirming section 24, of making a request asking a user to input a user password and of performing authentication of the user by judging whether or not the user password input from an operating section 22a coincides with the user password belonging to user information F obtained from a user registration information storing section 23.

Figure 5:
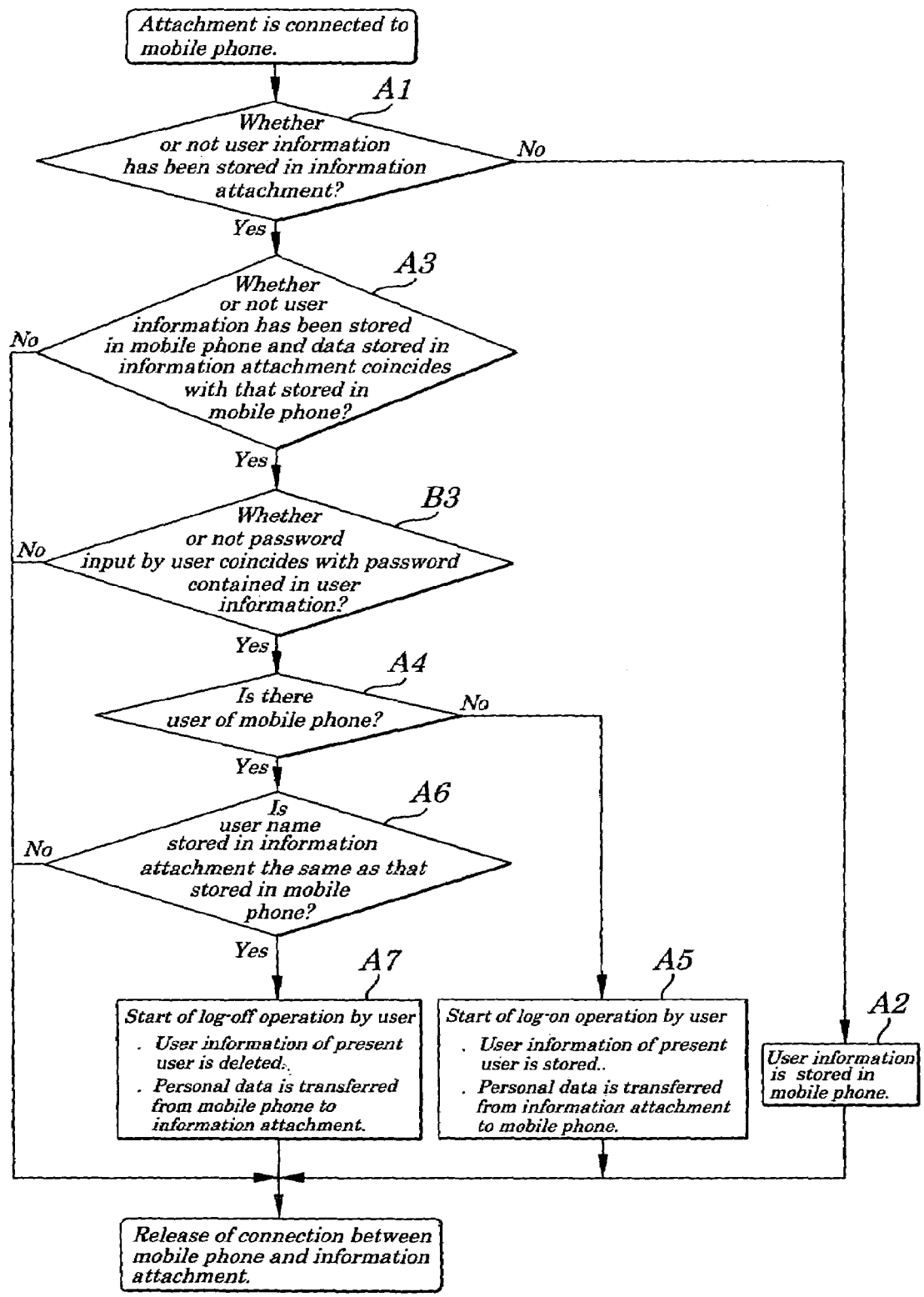
FIG. 5 is a flowchart explaining operations of the mobile phone shown in FIG. 4.

FIG. 5 is a flowchart explaining operations of the mobile phone 1A of FIG. 4. In FIG. 5, same step numbers are assigned to components having the same functions as those in the first embodiment shown in FIG. 3. Contents of a method for managing personal data to be employed in the mobile phone 1A of the second embodiment are described. The method for managing personal data of the second embodiment differs from that in the first embodiment in the following points. That is, as shown in FIG. 5, in Step A3, if user information F obtained from a user information storing section 12 coincides with data stored in the user registration information storing section 23, in Step B3, the user information registration confirming section 24A makes a request asking the user to input the user password. At this time, a message "Input a password" or a like is displayed on the display section (not shown). When the password is input from the controlling section 22a, the user information registration confirming section 24A judges whether or not the input user password coincides with the user password belonging to the user information F obtained from the user registration information storing section 23 and, if the input user password coincides with the user password belonging to the user information F, the routine proceeds to Step A4 and, if these passwords do not coincide with each other, the connection between the mobile phone proper 20A and an information attachment 10 is released to terminate the procedures.

Thus, in the second embodiment, when the information attachment 10 is connected to the mobile phone proper 20A, not only authentication according to the user information F stored in a user information storing section 12 of the information attachment 10 but also authentication according to the user password manually input is performed on the user and, therefore, the use of the information attachment 10 by a user other than the user whose user information F has been stored in the information attachment 10 is prevented. As a result, in addition to the advantages achieved in the first embodiment, an advantage that security of personal data by the information attachment 10 is improved more.

Also, as described above, the present invention can be applied to a case where, when one mobile phone is used by a plurality of users, personal data such as a telephone directory, electronic mail, or a like being stored in the mobile phone is managed, on an individual basis, for every user of the mobile phone.

It is apparent that the present invention is not limited to the above embodiments but may be changed and modified without departing from the scope and spirit of the invention. For example, in the second embodiment, authentication on the user may be performed not only by using such the user password as described above, but also by providing the mobile phone 20A with a fingerprint sensor (not shown) and by storing fingerprint-information of the user in the user registration information storing section 23 to check the stored fingerprint against the fingerprint information detected by the fingerprint sensor. In the present invention, the user may be not only a person but also a group made up of a plurality of members.

What is claimed is:

1. A mobile phone comprising:
a mobile phone proper; and
a plurality of storage units, each detachable from and attachable to said mobile phone proper, each of said storage units storing user information specifying the user authorized to use the storage unit;
wherein said mobile phone proper holds only specified data stored in one storage unit of said plurality of said storage units, said one storage unit logged-on by attaching the same one storage unit to said mobile phone proper, and
wherein said specified data is held in said mobile phone proper even while the same one storage unit is detached from said mobile phone proper, said specified data being held until log-off operations for the same one storage unit from said mobile phone proper are performed, said log-off operation being performed with the same one storage unit being reattached to said mobile phone proper.

2. The mobile phone according to claim 1, wherein said mobile phone proper performs log-off operations to move and save the specified data from the mobile phone proper into the same one storage unit corresponding to the log-off.

3. The mobile phone according to claim 1, wherein said plurality of said storage units each comprises a memory card.

4. A mobile phone for holding personal data of a user and performing a specified communicating operation comprising:
a mobile phone proper being commonly used by a plurality of users; and
a plurality of storage units each being used by each of the users and storing personal data of each of the users, each of said storage units storing user information specifying the user authorized to use the storage unit, and each of said storage units being detachable from and attachable to said mobile phone proper;
wherein said mobile phone proper holds the personal data of only a user who logged on by attaching the user's storage unit to said mobile phone proper, and the personal data of the user is held in said mobile phone proper between log-on operations for the same user's storage unit to said mobile phone proper and log-off operations for the same user's storage unit from said mobile phone proper, said specified data being held even while user's storage unit is detached from said mobile phone proper, said log-off operation being performed with the same user's storage unit being reattached to said mobile phone proper.

5. The mobile phone according to claim 4, wherein said mobile phone proper moves and saves the personal data of the user from said mobile phone proper into the same user's storage unit, when the user logs off from said mobile phone proper.

6. The mobile phone according to claim 4, wherein said mobile phone proper is configured, in log-on operations, when the user of said mobile phone has not been registered in said mobile phone proper, to register the user according to the user information being stored in the same user's storage unit connected to said mobile phone proper and to hold the personal data of the user by moving the personal data from the same user's storage unit and, in log-off operations, when the user has been registered in said mobile phone proper and when the personal data has been held in said mobile phone proper, to cancel the registration of the user and to move the personal data from said mobile phone proper to the same user's storage unit.

7. The mobile phone according to claim 4, wherein said mobile phone proper is so configured as to register authentication information of each of the users in advance, and to perform authentication on an arbitrary user who requires beginning or terminating of using said mobile phone, by checking the registered authentication information against authentication information input by the arbitrary user and, after the authentication, to perform said log-on or log-off operations.

8. The mobile phone according to claim 4, wherein said plurality of said storage units each comprises a memory card.

9. The mobile phone according to claim 4, wherein said user comprises a person or a group made up of a plurality of members.

10. A personal data managing method for managing personal data to be employed in a mobile phone comprising a mobile phone proper being commonly used by a plurality of users; and a plurality of storage units each being used by each of the users and storing personal data of each of the users, and each of said storage units being detachable from and attachable to said mobile phone proper, said method comprising:
- a step of holding the personal data of only a user who logged on by attaching the user's storage unit to said mobile phone proper, said user's storage unit storing user information specifying the user authorized to use the storage unit;
- a step of detaching the same user's storage unit from said mobile phone proper, said mobile phone proper holding the personal data of the user, even during disconnection between the same user's storage unit and said mobile phone proper; and
- a step of moving and saving the personal data of the user from said mobile phone proper into the same user's storage unit when the user logs off from said mobile phone proper, said user logging off being performed with the same user's storage unit being reattached to said mobile phone proper.

11. The personal data managing method for managing personal data according to claim 10, wherein said mobile phone proper, in said log-on operations, when the user has not been registered in said mobile phone proper, registers the user according to the user information being stored in the same user's storage unit connected to said mobile phone proper and moves the personal data of the user from the same user's storage unit to hold the personal data and, in said log-off operations, when the user has been registered in said mobile phone proper and the personal data of the user has been held, cancels the registration of the user and moves the personal data from said mobile phone proper to the same user's storage unit.

12. The personal data managing method for managing the personal data according to claim 10, wherein authentication information of each of said plurality of users is registered in advance in said mobile phone proper, and authentication is performed by checking the registered authentication information against authentication information input by the user who requires beginning or terminating of using said mobile phone and, after the authentication, said log-on or log-off operations are performed.

13. A personal data managing control program to make a computer mounted in a mobile phone execute a personal data managing method for managing personal data, the mobile phone comprising a mobile phone proper being commonly used by a plurality of users; and a plurality of storage units each being used by each of the users and storing personal data of each of the users, and each of said storage units being detachable from and attachable to said mobile phone proper, the method comprising:
- a step of holding the personal data of only a user who logged on by attaching the user's storage unit to said mobile phone proper, said user's storage unit storing user information specifying the user authorized to use the storage unit;
- a step of detaching the same user's storage unit from said mobile phone proper, said mobile phone proper holding the personal data of the user, even during disconnection between the same user's storage unit and said mobile phone proper; and
- a step of moving and saving the personal data of the user from said mobile phone proper into the same user's storage unit when the user logs off from said mobile phone proper, said user logging off being performed with the same user's storage unit being reattached to said mobile phone proper.

14. The personal data managing control program according to claim 13, wherein said mobile phone proper, in said log-on operations, when the user has not been registered in said mobile phone proper, registers the user according to the user information being stored in the same user's storage unit connected to said mobile phone proper and moves the personal data of the user from the same user's storage unit to hold the personal data and, in said log-off operations, when the user has been registered in said mobile phone proper and the personal data of the user has been held, cancels the registration of the user and moves the personal data from said mobile phone proper to the same user's storage unit.

15. The personal data managing control program according to claim 13, wherein authentication information of each of said plurality of users is registered in advance in said mobile phone proper, and authentication is performed by checking the registered authentication information against authentication information input by the user beginning or terminating use of said mobile phone and, after the authentication, said log-on or log-off operations are performed.

16. A mobile phone comprising:
- a mobile phone proper; and
- a plurality of storage units, each detachable from and attachable to said mobile phone proper, each of said plurality of said storage units storing user information specifying a user authorized to use the storage unit;
- wherein when a user's storage unit of said plurality of said storage units is attached and logged-on to said mobile phone proper, said mobile phone proper holds only specified data stored in said user's storage unit, and upon completion of log-on operations to said mobile phone proper, a connection between said mobile phone proper and said user's storage unit is released, and said specified data is held in said mobile phone proper even while said user's storage unit is detached from said mobile phone proper, and upon completion of a log-off operation to said mobile phone proper, the connection between said mobile phone proper and said user's storage unit is released and said specified data held in said mobile phone proper is released, said log-off operation being performed with said user's storage unit being reattached to said mobile phone proper.

17. The mobile phone according to claim 16, wherein when the user's storage unit is attached to said mobile phone proper, said mobile phone proper performs log-off operations to move and save the specified data from the mobile phone proper into the user's storage unit, and
wherein, upon completion of the log-off operations from said mobile phone proper, the connection between said mobile phone proper and the user's storage unit is released.

18. The mobile phone according to claim 16, wherein the connection between said mobile phone proper and the user's storage unit is an electric disconnection.

19. A mobile phone for holding personal data of a user and performing a specified communicating operation comprising:
- a mobile phone proper being commonly used by a plurality of users; and
- a plurality of storage units each being used by each of the users and storing personal data of each of the users, each of said plurality of said storage units storing user information specifying the user authorized to use the storage unit, and each of the storage units being detachable from and attachable to said mobile phone proper;

wherein said mobile phone proper holds the personal data of only a user who logged on to said mobile phone proper, the log-on operations being performed by attaching the user's storage unit to said mobile phone proper and by moving the personal data of the user from the user's storage unit to said mobile phone proper, and wherein upon completion of log-off operations to said mobile phone proper, a connection between said mobile phone proper and the user's storage unit is released, and said personal data of the user held in said mobile phone proper is released, said log-off operations being performed with the user's storage unit being reattached to said mobile phone proper.

20. The mobile phone according to claim 19, wherein said mobile phone proper moves and saves the personal data of the user from said mobile phone proper into the user's storage unit when the user logs off from said mobile phone proper, said moving and saving occurring by attaching the user's storage unit to said mobile phone proper, and wherein, upon completion of log-off operations from said mobile phone proper, the connection between said mobile phone proper and the user's storage unit is released.

* * * * *